United States Patent
Guo et al.

(10) Patent No.: US 12,294,999 B2
(45) Date of Patent: May 6, 2025

(54) METHOD AND APPARATUS FOR BEAM-BASED TRANSMISSION FOR SIDELINK

(71) Applicant: Lenovo (Beijing) Ltd., Beijing (CN)

(72) Inventors: Xin Guo, Chaoyang District (CN); Bingchao Liu, Changping District (CN); Xiaodong Yu, Haidian District (CN); Haipeng Lei, Haidian District (CN); Zhennian Sun, Chaoyang District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 298 days.

(21) Appl. No.: 17/797,818

(22) PCT Filed: Feb. 13, 2020

(86) PCT No.: PCT/CN2020/075085
§ 371 (c)(1),
(2) Date: Aug. 5, 2022

(87) PCT Pub. No.: WO2021/159388
PCT Pub. Date: Aug. 19, 2021

(65) Prior Publication Data
US 2023/0057174 A1    Feb. 23, 2023

(51) Int. Cl.
*H04W 72/20* (2023.01)
*H04W 72/542* (2023.01)

(52) U.S. Cl.
CPC ......... *H04W 72/20* (2023.01); *H04W 72/542* (2023.01)

(58) Field of Classification Search
CPC .............. H04B 7/0695; H04B 7/06954; H04B 7/06956; H04B 7/06958; H04B 7/06962;
(Continued)

(56) References Cited

U.S. PATENT DOCUMENTS

| 10,367,677 B2 * | 7/2019 | Parkvall | ............... H04J 11/0059 |
| 10,630,410 B2 * | 4/2020 | Parkvall | ............... H04L 5/1469 |

(Continued)

FOREIGN PATENT DOCUMENTS

| CN | 109391976 A | 2/2019 |
| CN | 109891802 A | 6/2019 |

(Continued)

OTHER PUBLICATIONS

PCT/CN2020/075085, "International Preliminary Report on Patentability", PCT Application No. PCT/CN2020/075085, Aug. 25, 2022, 5 pages.

(Continued)

*Primary Examiner* — Stephen J Clawson
(74) *Attorney, Agent, or Firm* — FIG. 1 Patents (57) ABSTRACT

Embodiments of the present application are directed to a method and apparatus for beam-based transmission for sidelink. The method may include: detecting spatial information contained in first sensed scheduling information; selecting a resource and a direction of a beam for data transmission based on the detected spatial information; transmitting second scheduling information including the selected resource and spatial information of the beam for the data transmission, where the spatial information of the beam includes the direction of the beam for the data transmission; and transmitting the data transmission by using the selected resource and the direction of the beam.

20 Claims, 9 Drawing Sheets

(58) Field of Classification Search
CPC ............ H04B 7/06964; H04B 7/06966; H04B 7/06968; H04L 5/0023; H04L 5/0094; H04W 48/12; H04W 72/044; H04W 72/20; H04W 72/51; H04W 72/542; H04W 72/25; H04W 72/27; H04W 72/29
See application file for complete search history.

(56) References Cited

U.S. PATENT DOCUMENTS

| | | | |
|---|---|---|---|
| 12,082,207 B2* | 9/2024 | Li | H04W 72/23 |
| 2013/0157676 A1* | 6/2013 | Baek | H04W 52/343 455/452.1 |
| 2013/0243602 A1* | 9/2013 | Pernleitner | F01D 5/225 416/223 R |
| 2013/0322413 A1* | 12/2013 | Pelletier | H04W 76/14 370/336 |
| 2014/0078971 A1* | 3/2014 | Bontu | H04W 8/005 370/328 |
| 2016/0330761 A1* | 11/2016 | Svedman | H04W 72/1273 |
| 2017/0188404 A1* | 6/2017 | Fodor | H04W 76/14 |
| 2017/0311227 A1* | 10/2017 | Kim | H04W 40/10 |
| 2018/0198501 A1* | 7/2018 | Park | H04B 7/0469 |
| 2018/0249453 A1* | 8/2018 | Nagaraja | H04W 48/20 |
| 2019/0281563 A1* | 9/2019 | Lee | H04W 72/30 |
| 2019/0320461 A1* | 10/2019 | Wu | H04W 72/046 |
| 2020/0045715 A1* | 2/2020 | Li | H04W 72/1263 |
| 2021/0068125 A1* | 3/2021 | Lin | H04W 76/14 |
| 2021/0120517 A1* | 4/2021 | Akkarakaran | H04W 88/08 |
| 2021/0185632 A1* | 6/2021 | Manolakos | H04L 5/0094 |
| 2022/0007337 A1* | 1/2022 | Lee | H04L 1/1822 |
| 2022/0007403 A1* | 1/2022 | Li | H04W 72/23 |
| 2022/0046430 A1* | 2/2022 | Liu | H04B 7/0695 |
| 2022/0078747 A1* | 3/2022 | Duan | H04L 5/0051 |
| 2022/0217674 A1* | 7/2022 | Bao | H04W 72/20 |
| 2023/0422271 A1* | 12/2023 | Tang | H04L 1/1896 |

FOREIGN PATENT DOCUMENTS

| | | |
|---|---|---|
| EP | 3609260 A1 | 2/2020 |
| WO | 2017197125 A1 | 11/2017 |
| WO | 2019036578 A1 | 2/2019 |
| WO | 2019160973 A1 | 8/2019 |

OTHER PUBLICATIONS

PCT/CN2020/075085 , "International Search Report and Written Opinion", PCT Application No. PCT/CN2020/075085, Nov. 10, 2020, 6 pages.

20918998.4 , "Extended European Search Report", EP Application No. 20918998.4, Sep. 14, 2023, 55 pages.

3GPP, "Evolved Universal Terrestrial Radio Access (E-UTRA) and Evolved Universal Terrestrial Radio Access Network (E-UTRAN)", 3GPP TS 36.300, V16.0.0, Overall Description, Stage 2 [retrieved Oct. 30, 2023]. Retrieved from the Internet <https://portal.3gpp.org/desktopmodules/Specifications/SpecificationDetails.aspx?specificationId=2430>, Dec. 2019, 366 pages.

"Communication Pursuant to Article 94(3) EPC", EP Application No. 20918998.4, Nov. 18, 2024, 7 pages.

* cited by examiner

METHOD AND APPARATUS FOR BEAM-BASED TRANSMISSION FOR SIDELINK

TECHNICAL FIELD

The present application generally relates to wireless communication technology, and especially to a method and apparatus for beam-based transmission for sidelink.

BACKGROUND

In a wireless communication system, a user equipment (UE) (e.g., mobile device) may communicate with another UE via a data path of an operator network. The data path of the operator network may include a base station (BS) and gateways.

In the case that a UE and another UE are relatively close to each other, a radio link or a sidelink can be established to provide Device-to-Device (D2D) communication. The term "sidelink" refers to a direct radio link for communication among devices, as opposed to communication via the cellular infrastructure (uplink and downlink) as discussed above. The "sidelink" is also referred to as a D2D link. D2D communication may be used in any suitable telecommunication network in accordance with various standards. The network may configure a resource pool that may perform the D2D operation to the UE.

D2D operation may provide various advantages, for example, a relatively high transfer rate, a relatively low delay, etc. Moreover, in D2D operation, traffic concentrated on a base station can be distributed. Furthermore, D2D UE may function as a relay to extend coverage of a base station.

D2D communication evolves into vehicle-to-anything (V2X) communication in the Long Term Evolution (LTE) sidelink, and has been introduced into 5G wireless communication technology. V2X communications encompass communications involving vehicles as message sources or destinations. Sidelink enables a direct communication between UEs in proximity, and data does not need to go through a BS or a core network.

To meet the ever increasing Quality of Service (QoS) requirements for the V2X communication, operating in the millimeter wave (mmWave) band or even terahertz (THz) band becomes a promising solution, since the above frequencies are expected to provide high capacity and support connections of high data rate as well as delay-sensitive data exchange. Although mmWave/THz communication is very attractive from the data throughput perspective, it creates challenges for the physical layer. Due to high propagation loss, the use of mmWave/THz bands is deemed suitable for mainly short range (a few hundred meters) and point-to-point Line Of Sight (LoS) communications. To maintain the desired communication range, operating in mmWave/THz bands is assumed to use directional antenna systems to compensate the greater propagation losses. Hence, efficient beam management method is required for V2X sidelink systems operating in mmWave/THz bands.

SUMMARY OF THE APPLICATION

Embodiments of the present application provide a method and apparatus for beam-based transmission for sidelink.

An embodiment of the present application provides a method. The method may include: detecting spatial information contained in first sensed scheduling information; selecting a resource and a direction of a beam for data transmission based on the detected spatial information; transmitting second scheduling information including the selected resource and spatial information of the beam for the data transmission, where the spatial information of the beam includes the direction of the beam for the data transmission; and transmitting the data transmission by using the selected resource and the direction of the beam.

In an embodiment of the present application, the method may further include calculating the direction of the beam for the data transmission based on direction configuration information, where the direction configuration information is received in a system information block (SIB) or is in pre-configuration. The direction of the beam for the data transmission may be represented by an elevation angle and an azimuth angle. Values of the elevation angle and the azimuth angle may be integers within a range from zero to a certain maximized value.

In an embodiment of the present application, the spatial information may further include at least one of a location of a transmitting user equipment (UE) and a location of a receiving UE.

In an embodiment of the present application, selecting a resource and a direction of a beam for data transmission based on the detected spatial information may include: selecting the resource indicated in the first sensed scheduling information and reserved by other beams, when spatial multiplexing is achieved by the selected direction of beam.

In an embodiment of the present application, the second scheduling information may further explicitly or implicitly include a time duration of a time offset, where the time offset defines a number of orthogonal frequency division multiple (OFDM) symbols which can be measured from a last symbol containing the second scheduling information to the first symbol of the data transmission. The time offset may be set to be larger than or equal to a time bound for a transmitting UE to use information in the second scheduling information for transmitting the data transmission or for a receiving UE to use information in the second scheduling information for receiving the data transmission.

In an embodiment of the present application, the second scheduling information is transmitted by an omni-directional antenna, and the data transmission is transmitted by beam-based transmission.

Another embodiment of the present application provides a method. The method may include: receiving a scheduling request for data transmission; detecting spatial information contained in first sensed scheduling information; selecting a resource and a direction of a beam for the data transmission based on the detected spatial information; and transmitting second scheduling information including the selected resource and spatial information of the beam for the data transmission, where the spatial information of the beam includes the direction of the beam for the data transmission.

In an embodiment of the present application, the method may further include receiving the data transmission by using the selected resource and the direction of the beam.

In an embodiment of the present application, the method may further include calculating the direction of the beam for the data transmission based on direction configuration information, where the direction configuration information is received in a system information block (SIB) or is in pre-configuration. The direction of the beam for the data transmission may be represented by an elevation angle and an azimuth angle. Values of the elevation angle and the azimuth angle may be integers within a range from zero to a certain maximized value.

In an embodiment of the present application, the spatial information may further include at least one of a location of a transmitting user equipment (UE) and a location of a receiving UE.

In an embodiment of the present application, selecting a resource and a direction of a beam for data transmission based on the detected spatial information may include: selecting the resource indicated in the first sensed scheduling information and reserved by other beams, when spatial multiplexing is achieved by the selected direction of beam.

In an embodiment of the present application, the scheduling request may further explicitly or implicitly include a latency bound for selected resource, and the latency bound defines a maximized time offset from the reception of scheduling request to the end of the data transmission.

In an embodiment of the present application, the second scheduling information may be transmitted by an omni-directional antenna, and the data transmission may be received by beam-based transmission.

Another embodiment of the present application provides a method. The method may include: receiving a scheduling request for data transmission; allocating a resource and a direction of a beam for data transmission and a resource for scheduling information in response to the scheduling request; and transmitting the allocated resource and spatial information of the beam for the data transmission and the allocated resource for the scheduling information, where the spatial information of the beam includes the direction of the beam for the data transmission.

In an embodiment of the present application, the method may further include calculating the direction of the beam for the data transmission based on direction configuration information. The direction of the beam for the data transmission may be represented by an elevation angle and an azimuth angle. Values of the elevation angle and the azimuth angle may be integers within a range from zero to a certain maximized value.

In an embodiment of the present application, the scheduling request may further include a time duration for a transmitting user equipment (UE) or a receiving UE to use the allocated resource and the direction of the beam for the data transmission.

In an embodiment of the present application, the method may further include receiving a capability of the transmitting UE and/or the receiving UE.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can use an efficient beam management and can enhance utilization of spatial multiplexing achieved by beam.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G. It is contemplated that along with developments of network architectures and new service scenarios, all embodiments in the present application are also applicable to similar technical problems; and moreover, the terminologies recited in the present application may change, which should not affect the principle of the present application.

Figure 1:
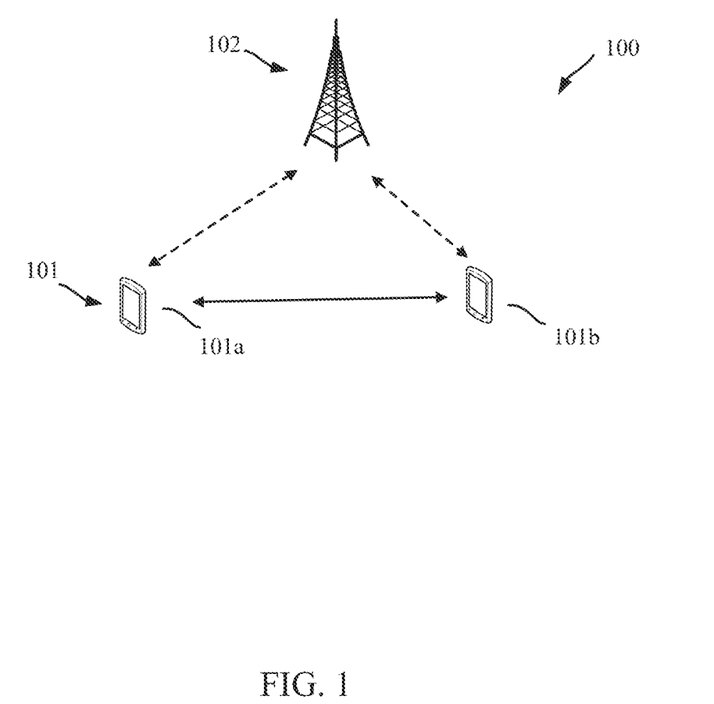
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101a and UE 101b) and one BS 102 for illustrative purpose. Although a specific number of UEs 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, UE is pedestrian UE (P-UE or PUE) or cyclist UE. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via LTE or NR Uu interface.

In some embodiments of the present application, each of the UE(s) 101 may be deployed an IoT application, an eMBB application and/or a URLLC application. For instance, UE 101*a* may implement an IoT application and may be named as an IoT UE, while UE 101*b* may implement an eMBB application and/or a URLLC application and may be named as an eMBB UE, an URLLC UE, or an eMBB/URLLC UE. It is contemplated that the specific type of application(s) deployed in the UE(s) 101 may be varied and not limited.

According to some embodiments of FIG. 1, UE 101*a* functions as Tx UE, and UE 101*b* functions as Rx UE. UE 101*a* may exchange V2X messages with UE 101*b* through a sidelink, for example, PC5 interface as defined in 3GPP TS 23.303. UE 101*a* may transmit information or data to other UE(s) within the V2X communication system, through sidelink unicast, sidelink groupcast, or sidelink broadcast. For instance, UE 101*a* transmits data to UE 101*b* in a sidelink unicast session. UE 101*a* may transmit data to UE 101*b* and other UEs in a groupcast group (not shown in FIG. 1) by a sidelink groupcast transmission session. Also, UE 101*a* may transmit data to UE 101*b* and other UEs (not shown in FIG. 1) by a sidelink broadcast transmission session.

Alternatively, according to some other embodiments of FIG. 1, UE 101*b* functions as Tx UE and transmits V2X messages, UE 101*a* functions as Rx UE and receives the V2X messages from UE 101*b*.

Both UE 101*a* and UE 101*b* in the embodiments of FIG. 1 may transmit information to BS 102 and receive control information from BS 102, for example, via LTE or NR Uu interface. BS(s) 102 may be distributed over a geographic region. In certain embodiments of the present application, each of BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, where BS(s) 102 transmit data using an OFDM modulation scheme on the downlink (DL) and the UE(s) 101 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, BS(s) 102 may communicate with UE(s) 101 using the 3GPP 5G protocols.

Figure 2:
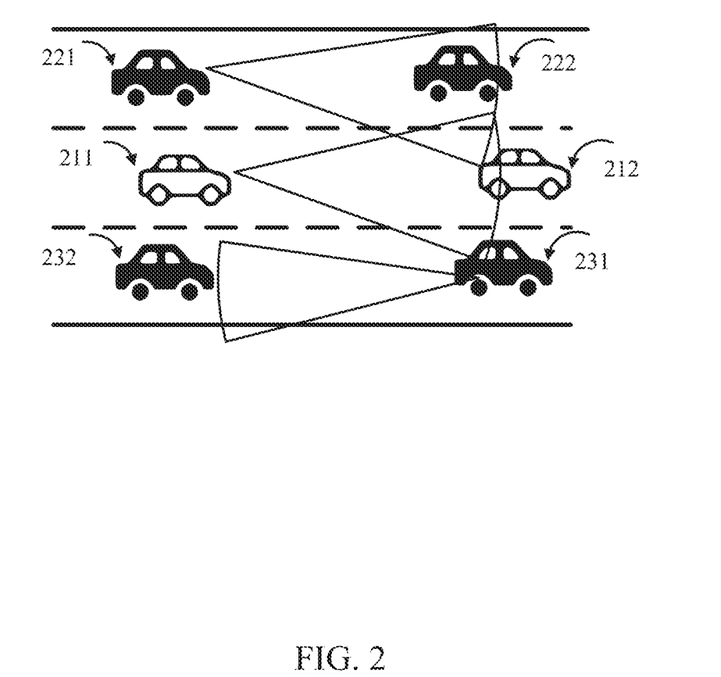
FIG. 2 illustrates some scenarios of using directional antenna systems.

FIG. 2 illustrates some scenarios of using directional antenna systems.

As shown in FIG. 2, reference numbers 211, 221, and 231 may represent Tx UEs, and reference numbers 212, 222, and 232 may represent Rx UEs. In a scenario, Tx UE1 211 sends scheduling information of resource, for example, SubChannel #N, to its corresponding Rx UE1 212 through beam-based sidelink transmission. The surrounding Tx UE2 221 may also select the same resource, SubChannel #N, to use for its corresponding Tx UE2 222, because Tx UE2 222 cannot identify the resource reserved for sidelink between Tx UE1 211 and Rx UE1 212. Therefore, a strong interference occurs to both Rx UE1 212 and Rx UE2 222.

Further referring to FIG. 2, in another scenario, in the case that Tx UE1 211 sends the scheduling information of resource, SubChannel #N, to its corresponding Rx UE1 212, Tx UE3 231 may sense the scheduling information from Tx UE1 211 and identify the resource SubChannel #N reserved by Tx UE1 211, and thus Tx UE3 231 probably remove the resource SubChannel #N from its candidate resource set according to the existing rule.

However, as shown in FIG. 2, if spatial multiplexing is adopted, both sidelinks of Tx UE3 231 to Rx UE3 232 and Tx UE1 211 to Rx UE1 212 can operate on the same resource SubChannel #N simultaneously. However, there is no information which can facilitate Tx UE3 231 to identify the opportunity.

Figure 3:
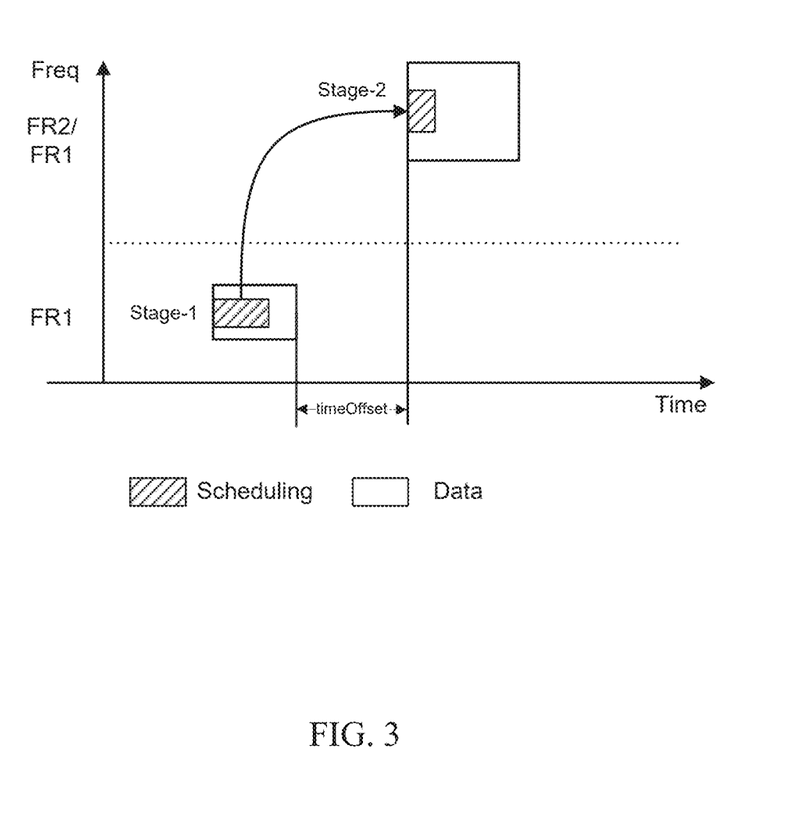
FIG. 3 is an exemplary diagram showing a Stage-1 Scheduling procedure and a Stage-2 Transmission procedure in accordance with some embodiments of the present application.

FIG. 3 is an exemplary diagram showing a Stage-1 Scheduling procedure and a Stage-2 Transmission procedure in accordance with some embodiments of the present application.

As shown in FIG. 3, the Stage-1 Scheduling procedure and the Stage-2 Transmission procedure may include two parts, scheduling signaling and data. For example, the scheduling signaling may include sidelink control information (SCI), MAC control element (CE), or the like. Alternatively, according other embodiments of the present application, the Stage-1 Scheduling procedure may only include the scheduling signaling according to actual needs, and the Stage-2 Transmission procedure may only include data according to actual needs.

In the Stage-1 Scheduling procedure, at least one of resource reservation information, beam information (such as quasi co-located (QCL) or transmission configuration indicator (TCI)), and spatial information of beam for the Stage-2 Transmission procedure may be transmitted. According to some embodiments, the spatial information of the beam may include beam direction information, location information of the UE, or the like. In particular, the spatial information of the beam may include at least one of the following:

(1) transmit beam direction;
(2) reception beam direction;
(3) location of Tx UE;
(4) location of Rx UE;
(5) moving direction of Tx UE;
(6) moving direction of Rx UE;
(7) trajectory of Tx UE;
(8) trajectory of Rx UE;
(9) boresight direction from Tx UE to Rx UE; and
(10) angular offset of transmit (reception) beam from any one of the above (5), (6), (7), (8), and (9).

In the above spatial information of the beam, the direction of the beam (for example, the transmit beam direction or the reception beam direction) may be defined by elevation and azimuth angles, and the trajectory (for example, the trajectory of Tx UE or the trajectory of Rx UE) may be defined by a location and a direction.

Furthermore, in the Stage-1 Scheduling procedure, the resource reservation information, the beam information, and the spatial information of the beam for the Stage-2 Transmission procedure can be transmitted in SCI or in MAC CE. In some embodiments, the SCI may include two stages' SCI, that is, a first stage SCI and a second stage SCI. For example, the first stage SCI may indicate the SCI for carrying information commonly for the broadcast, unicast, and groupcast, and the second stage SCI may indicate the SCI for carrying information only for the unicast and groupcast. In an embodiment, the resource reservation information, the beam information, and the spatial information of the beam for the Stage-2 Transmission procedure can be transmitted in the first stage SCI.

In the Stage-2 Transmission procedure, data or channel state information-reference signal (CSI-RS) for sidelink channel state information (CSI) measurement and report may be transmitted. According to some embodiments, as shown in FIG. 3, the Stage-2 Transmission procedure may further transmit SCI signaling, such as the second stage SCI.

In an embodiment, if the second stage SCI is included, the rest information, which is not included in the Stage-1 Scheduling procedure, for the Rx UE to perform reception and decoding of the Stage-2 Transmission of data may be transmitted. Alternatively, in another embodiment, if the second stage SCI is included, the overall information needed for Rx UE to perform reception and decoding of Stage-2 Transmission of data, including the information included in the Stage-1 Scheduling procedure may be transmitted. The benefit for the transmitting of the overall information is to provide coexistence for UE which is working on high frequency band (such as FR2) without cross-carrier scheduling supporting.

In 5G NR, a frequency range (FR) of 5G NR is divided into FR1 and FR2, the frequency range of FR1 is from 450 to 6000 MHz, and the frequency range of FR2 is from 24250 to 52600 MHz.

As shown in FIG. 3, the Stage-1 Scheduling procedure may operate in FR1, and the Stage-2 Transmission procedure may operate in FR1 or FR2. In addition, the information transmitted during the Stage-1 Scheduling procedure may be transmitted by an omni-directional antenna, and by broadcast or groupcast. The information transmitted during the Stage-2 Transmission procedure may be transmitted by beam-based transmission, and by unicast or groupcast or broadcast.

Furthermore, as shown in FIG. 3, there is a "timeOffset" between the Stage-1 Scheduling procedure and the Stage-2 Transmission procedure. In particular, the timeOffset may define the number of OFDM symbols which can be measured from the last symbol of the Stage-1 Scheduling procedure to the first symbol of the Stage-2 Transmission procedure.

The following will describe the method for beam-based transmission for sidelink in connection with the detailed embodiments of the present application.

In the present application, at least one of two modes may be used for resource allocation for sidelink communication, that is, Mode 1 and Mode 2.

Mode 1 is a mode in which resources for proximity based service (ProSe) direct communication are scheduled by a BS. The UE needs to be in the RRC_CONNECTED state in order to send data in accordance with Mode 1. The UE requests a transmission resource from the BS. The BS performs scheduling assignment and schedules resources for sending data. The UE may send a scheduling request to the BS and send a ProSe Buffer Status Report (BSR). The BS has data to be subjected to ProSe direct communication by the UE based on the ProSe BSR and determines that a resource for transmission is required.

Mode 2 is a mode in which the UE directly selects a resource. In particular, the UE directly selects a resource for ProSe direct communication in a resource pool. The resource pool may be configured by a network or may have been previously determined. Meanwhile, if the UE has a serving cell, that is, if the UE is in the RRC_CONNECTED state with an BS or is placed in a specific cell in the RRC_IDLE state, the UE is considered to be placed within coverage of the BS. If the UE is placed outside coverage, only Mode 2 may be applied. If the UE is placed within the coverage, the UE may use Mode 1 or Mode 2 depending on the configuration of the BS.

Figure 4:
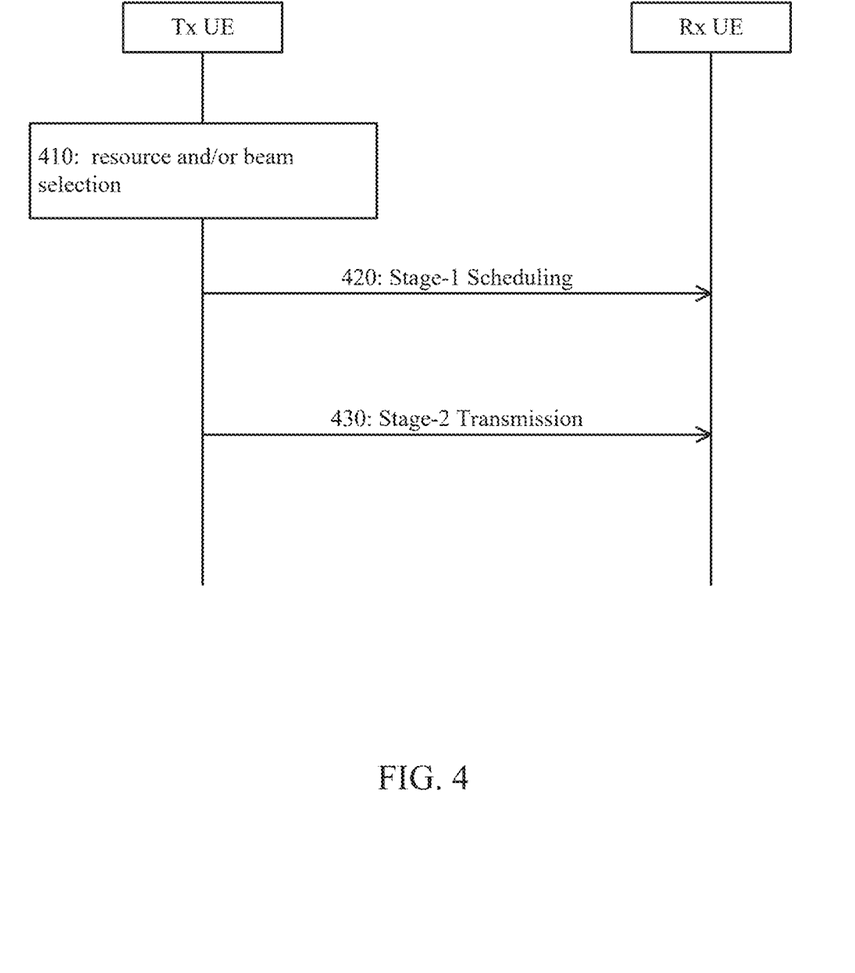
FIG. 4 illustrates an exemplary flow chart illustrating a method for beam-based transmission for sidelink in accordance with an embodiment of the present application.

FIG. 4 illustrates an exemplary flow chart illustrating a method for beam-based transmission for sidelink in accordance with an embodiment of the present application. In this embodiment, Mode 2 is used for resource allocation for sidelink communication.

In the embodiments of FIG. 4, Tx UE (e.g., UE 101a illustrated in FIG. 1) may sense or detect scheduling information of other beams, and further detect spatial information contained in sensed or detected scheduling information of other beams. In step 410, Tx UE performs resource and/or beam selection based on the sensed or detected scheduling information. In particular, Tx UE may select a resource and a direction of a beam for the Stage-2 Transmission procedure based on the detected spatial information. In an embodiment, Tx UE may select the resource indicated in the sensed scheduling information and reserved by other beams, if spatial multiplexing can be achieved by the selected direction of the beam. In another embodiment, Tx UE may select resource except the resource indicated in the sensed scheduling information and reserved by other beams.

Furthermore, in step 410, Tx UE may calculate the direction of the beam for the data transmission in the Stage-2

Transmission procedure based on direction configuration information, for example, "directionConfig". The direction configuration information may be received in a system information block (SIB) or is in pre-configuration such as of resource pool. The direction of the beam for the data transmission in the Stage-2 Transmission procedure may be represented by an elevation angle and an azimuth angle.

Figure 7:
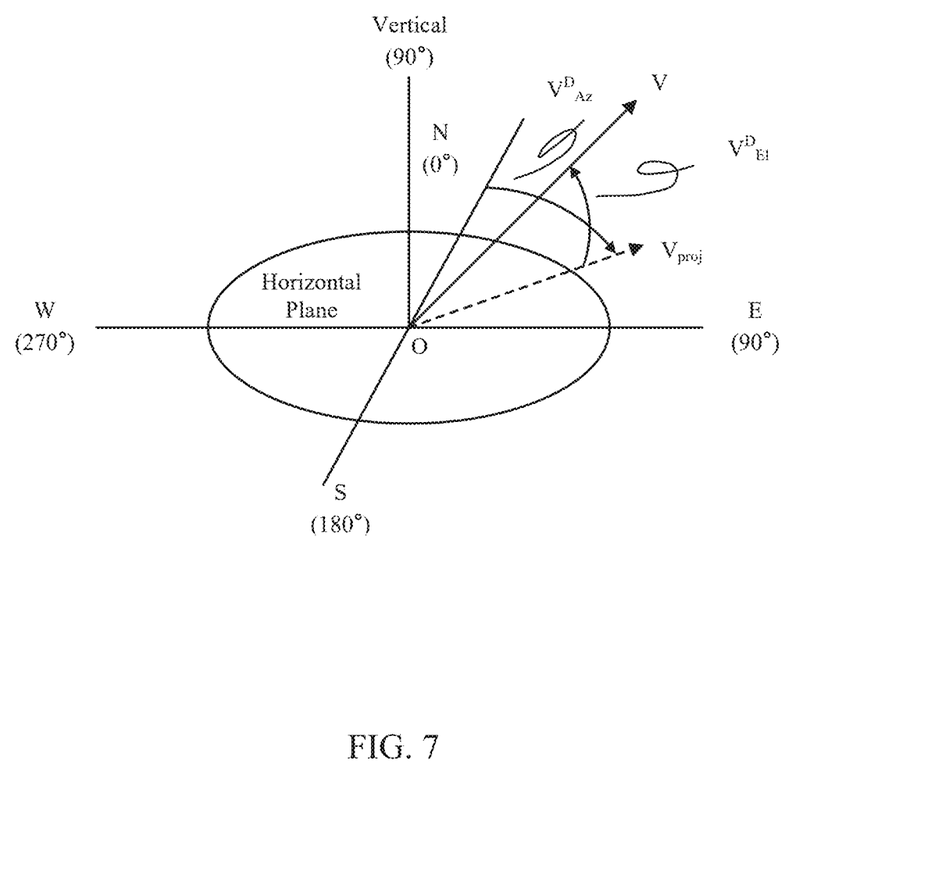
FIG. 7 is an exemplary diagram for illustrating the direction of the beam for the Stage-2 Transmission according to some embodiments of the present application.

FIG. 7 is an exemplary diagram for illustrating the direction of the beam for the data transmission in the Stage-2 Transmission procedure according to some embodiments of the present application.

As shown in FIG. 7, given a direction, denoted by V, the azimuth and elevation angles in terms of degree for V are denoted by $V^D_{Az}$ and $V^D_{El}$, respectively. Set $V_{proj}$ as the projection of V on horizontal plane. $V^D_{Az}$ is measured as the angular offset of $V_{proj}$ against north (N) in clockwise direction. $V^D_{El}$ is measured as the angular offset of V against $V_{proj}$ in anti-clockwise direction. Tx UE will determine a quantized direction of V using the following formulae, if "directionConfig" is included in System Information Block or in Pre-configuration such as of resource pool:

$$V_{Az} = \text{Floor}(V^D_{Az}/Az^D);$$

$$V_{El} = \text{Floor}(V^D_{El}/El^D);$$

The values of $V_{Az}$ and $V_{El}$ are described as INTEGER within a range from zero to a certain maximized value. The maximized value will be determined by the number of bits of the corresponding field to contain the information.

The parameters in the above formulae are defined as follows:
   $Az^D$ is the value in terms of degree of direationAzimuth included in directionConfig in SIB or in Pre-configuration such as of resource pool;
   $El^D$ is the value in terms of degree of direntionElevation included in directionConfig in SIB or in Pre-configuration such as of resource pool.

Tx UE will calculate the direction represented by a 2-tuple of ($V_{Az}$, $V_{El}$) according to above mentioned formulae. It should be understood that Tx UE uses its latest geographical coordinates to perform direction calculation.

Now referring back to FIG. 4, after performing the resource and/or beam selection based on the sensed scheduling information, in step 420, Tx UE performs the Stage-1 Scheduling procedure. In particular, Tx UE may transmit scheduling information including the selected resource and spatial information of the beam for the data transmission of the Stage-2 Transmission procedure, to Rx UE (e.g., UE 101b illustrated in FIG. 1), and the spatial information includes the calculated direction of the beam. For example, Tx UE may transmit the scheduling information for the data transmission of the Stage-2 Transmission procedure by SCI signaling or a MAC CE.

In an embodiment, a time duration of timeOffset (See FIG. 3) can be explicitly or implicitly indicated in the scheduling information of the Stage-1 Scheduling procedure. "Explicitly" means that there is a field for indicating "timeOffset" in the scheduling information. "Implicitly" means that there is no field for indicating "timeOffset", but the Rx UE may calculate the time duration of timeOffset according to resource in the time domain allocated for the Stage-1 scheduling procedure and for the Stage-2 Transmission procedure. In particular, the time offset may define a number of OFDM symbols which can be measured from a last symbol containing the scheduling information to the first symbol of the Stage-2 transmission. Furthermore, in some embodiments, if required, due to UE capability (such as a UE antenna switching capability), the timeOffset may be set to be larger than or equal to a time bound for Tx UE to use the scheduling information in the Stage-1 Scheduling procedure for transmitting for the data transmission of the Stage-2 Transmission procedure, or for Rx UE to use the scheduling information in the Stage-1 Scheduling procedure for receiving the data transmission. In that case, corresponding capability of Rx UE should be reported to Tx UE in advance, for example, during a sidelink establishment stage.

And then, after performing the Stage-1 Scheduling, in step 430, Tx UE performs the Stage-2 Transmission procedure. In particular, Tx UE transmits the data transmission by using the selected resource and the direction of the beam.

Figure 5:
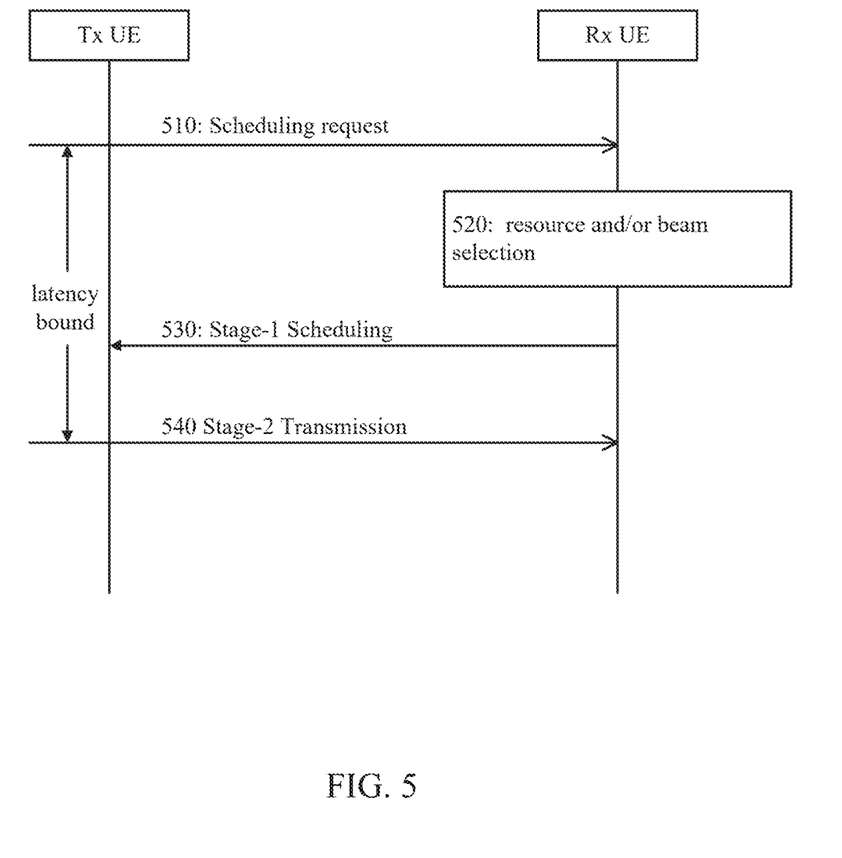
FIG. 5 illustrates an exemplary flow chart illustrating another method for beam-based transmission for sidelink in accordance with an embodiment of the present application.

FIG. 5 illustrates an exemplary flow chart illustrating another method for beam-based transmission for sidelink in accordance with an embodiment of the present application. In this embodiment, Mode 2 is used for resource allocation for sidelink communication.

In the embodiments of FIG. 5, in step 510, Tx UE (e.g., UE 101a illustrated in FIG. 1) transmits a sidelink scheduling request (for example, when Tx UE has an intention to transmit data via sidelink), to Rx UE (e.g., UE 101b illustrated in FIG. 1), for example, by SCI signaling. In an embodiment, the scheduling request may further explicitly or implicitly include a latency bound in order to guarantee QoS requirement of target data to be transmitted in the Stage-2 Transmission procedure. "Explicitly" means that there is a field for indicating the latency bound in the scheduling request. "Implicitly" means that there is no field for indicating the latency bound in the scheduling request, but the Rx UE may calculate the latency bound according to information of the data to be transmitted, such as the traffic type or priority level. The priority level can be, such as, ProSe Per-Packet Priority (PPPP) defined in LTE sidelink or the priority level defined in PC5 5G QoS Identifier (PQI). In particular, the latency bound may define a maximized time offset from the reception of scheduling request to the end of the Stage-2 Transmission procedure.

In the embodiments of FIG. 5, Rx UE may sense or detect scheduling information of other beams, and further detect spatial information contained in sensed or detected scheduling information of other beams. Upon receiving the sidelink scheduling request, in step 520, the Rx UE performs resource and/or beam selection based on detected spatial information of other beams. In particular, Rx UE may select a resource and a direction of a beam for the data transmission of the Stage-2 Transmission procedure based on the detected spatial information. In an embodiment, Rx UE may select the resource indicated in the sensed scheduling information and reserved by other beams, if spatial multiplexing can be achieved by the selected direction of beam. In another embodiment, Rx UE may select resource except the resource indicated in the sensed scheduling information and reserved by other beams. Furthermore, in step 520, Rx UE may calculate the direction of the beam for the Stage-2 Transmission procedure based on direction configuration information, for example, directionConfig, as above discussed in FIG. 7.

After performing resource and/or beam selection based on the sensed scheduling information, in step 530, Rx UE performs the Stage-1 Scheduling procedure. In particular, Rx UE may transmit scheduling information including the selected resource and spatial information of the beam for the data transmission of the Stage-2 Transmission procedure, to Tx UE, and the spatial information includes the calculated direction of the beam. For example, Tx UE may transmit the scheduling information for the data transmission of the Stage-2 Transmission procedure by SCI signaling or a MAC CE.

After receiving the scheduling information from Rx UE, Tx UE performs the Stage-2 Transmission procedure. In particular, Tx UE transmits the data transmission by using the selected resource and the direction of the beam in the scheduling information.

Figure 6:
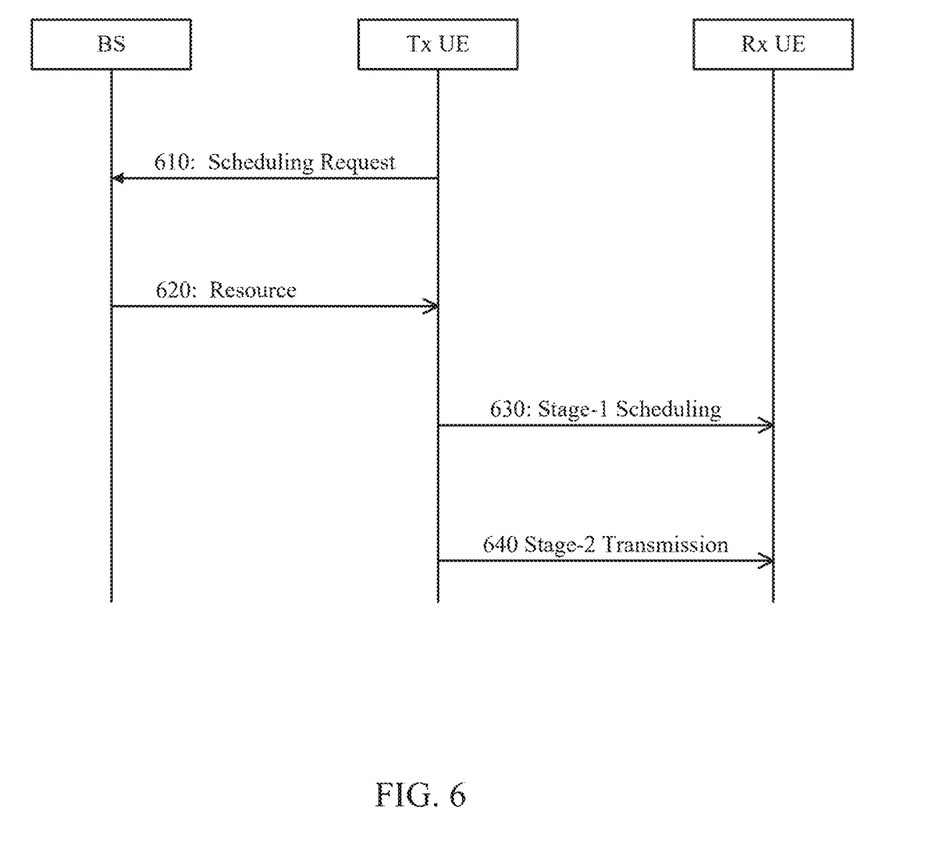
FIG. 6 illustrates an exemplary flow chart illustrating yet another method for beam-based transmission for sidelink in accordance with an embodiment of the present application.

FIG. 6 illustrates an exemplary flow chart illustrating yet another method for beam-based transmission for sidelink in accordance with an embodiment of the present application. In this embodiment, Mode 1 is used for resource allocation for sidelink communication.

In the embodiments of FIG. 6, in step 610, Tx UE (e.g., UE 101a illustrated in FIG. 1) transmits a scheduling request (for example, Tx UE has an intention to transmit data via sidelink), to the BS (e.g., BS 102 illustrated in FIG. 1). In an embodiment, if required due to UE capability (such as a UE antenna switching capability), the scheduling request may further include a time duration for Tx UE to use information in the Stage-1 Scheduling procedure for transmitting the data transmission of the Stage-2 Transmission procedure, or for Rx UE to use the scheduling information in the Stage-1 Scheduling procedure for receiving the data transmission. In an embodiment, the corresponding capability (such as a UE antenna switching capability) of Tx UE or Rx UE should be reported to the BS along with the scheduling request. In that case, corresponding capability of Rx UE may be reported to Tx UE in advance, for example, during a sidelink establishment stage.

Upon receiving the scheduling request from Tx UE, in step 620, the BS will perform resource scheduling and indicating. In particular, the BS will allocate a resource and calculate a direction of a beam for the Stage-2 Transmission procedure, and allocate a resource for the Stage-1 Scheduling procedure in response to the scheduling request, and then the BS will transmit the allocated resource and spatial information of the beam for the data transmission of the Stage-2 Transmission procedure and the allocated resource for the Stage-1 Scheduling procedure, to Tx UE, and the spatial information includes the direction of the beam. For example, the BS may calculate the direction of the beam for the Stage-2 Transmission based on direction configuration information, for example, directionConfig, as above discussed in FIG. 7.

After receiving the information from the BS, in step 630, Tx UE performs the Stage-1 Scheduling procedure. In particular, Tx UE may transmit scheduling information including the selected resource and spatial information of the beam for the data transmission of the Stage-2 Transmission procedure, to Rx UE (e.g., UE 101b illustrated in FIG. 1), by using the allocated resource for the Stage-1 Scheduling procedure. For example, Tx UE may transmit the scheduling information for the data transmission of the Stage-2 Transmission procedure by SCI signaling or a MAC CE.

And then, after performing the Stage-1 Scheduling, in step 640, Tx UE performs the Stage-2 Transmission procedure. In particular, Tx UE transmits the data transmission by using the selected resource and the direction of the beam.

Therefore, through the above described embodiments of the present application, an efficient beam management may be used and utilization of spatial multiplexing achieved by beam can be enhanced.

Figure 8:
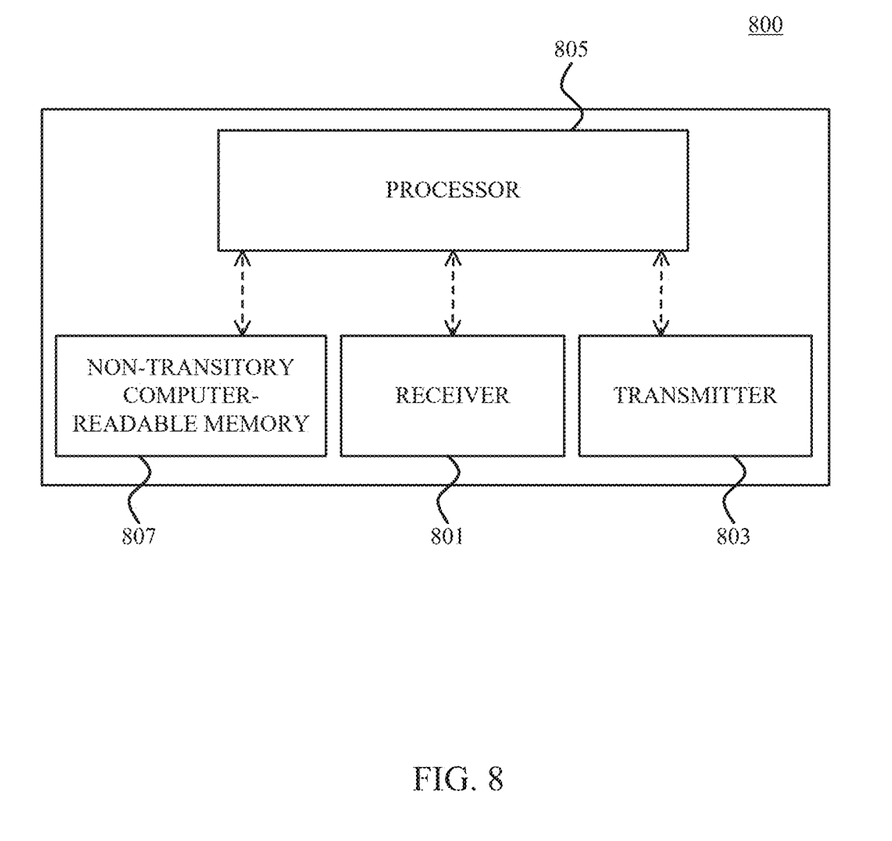
FIG. 8 illustrates an apparatus according to some embodiments of the present application.

FIG. 8 illustrates an apparatus according to some embodiments of the present application. In some embodiments of the present disclosure, the apparatus 800 may be UE 101a or UE 101b illustrated in FIG. 1 or the UE in other embodiments of the present application.

As shown in FIG. 8, the apparatus 800 may include a receiver 801, a transmitter 803, a processor 805, and a non-transitory computer-readable medium 807. The non-transitory computer-readable medium 807 has computer executable instructions stored therein. The processor 805 is configured to be coupled to the non-transitory computer readable medium 807, the receiver 801, and the transmitter 803. It is contemplated that the apparatus 800 may include more computer-readable mediums, receiver, transmitter and processors in some other embodiments of the present application according to practical requirements. In some embodiments of the present application, the receiver 801 and the transmitter 803 are integrated into a single device, such as a transceiver. In certain embodiments, the apparatus 800 may further include an input device, a memory, and/or other components.

In some embodiments of the present application, the non-transitory computer-readable medium 807 may have stored thereon computer-executable instructions to cause a processor to implement the above methods according to embodiments of the present application.

Figure 9:
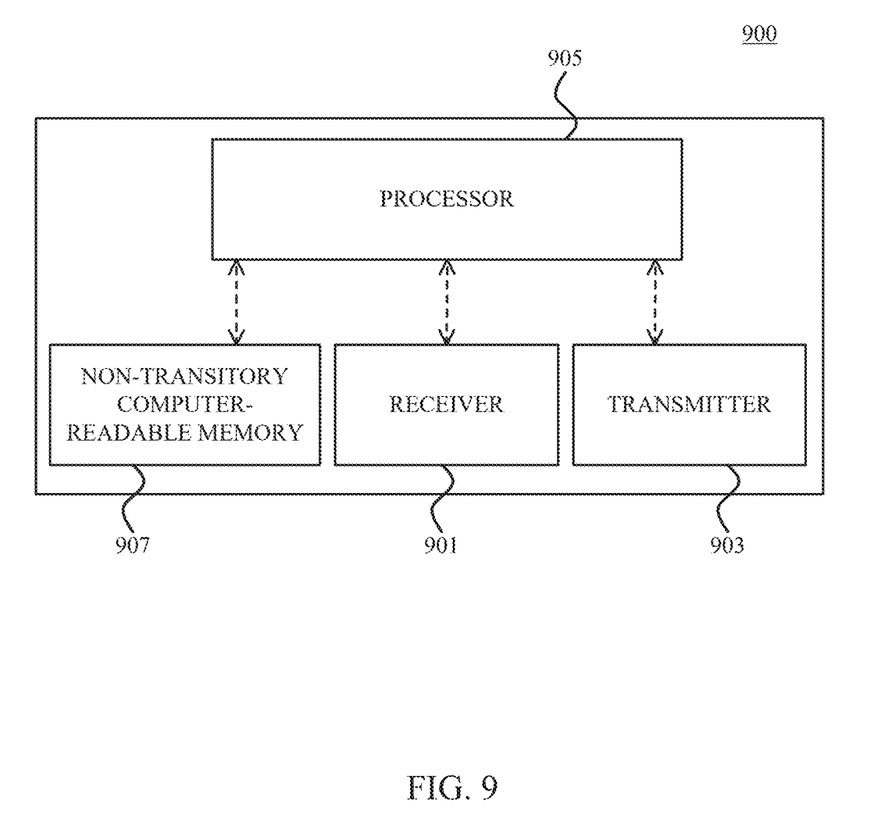
FIG. 9 illustrates an apparatus according to some embodiments of the present application.

FIG. 9 illustrates an apparatus according to some embodiments of the present application. In some embodiments of the present disclosure, the apparatus 900 may be BS 102 illustrated in FIG. 1 or the BS in other embodiments of the present application.

As shown in FIG. 9, the apparatus 900 may include a receiver 901, a transmitter 903, a processor 905, and a non-transitory computer-readable medium 907. The non-transitory computer-readable medium 907 has computer executable instructions stored therein. The processor 905 is configured to be coupled to the non-transitory computer readable medium 907, the receiver 901, and the transmitter 903. It is contemplated that the apparatus 900 may include more computer-readable mediums, receiver, transmitter and processors in some other embodiments of the present application according to practical requirements. In some embodiments of the present application, the receiver 901 and the transmitter 903 are integrated into a single device, such as a transceiver. In certain embodiments, the apparatus 900 may further include an input device, a memory, and/or other components.

In some embodiments of the present application, the non-transitory computer-readable medium 907 may have stored thereon computer-executable instructions to cause a processor to implement the above methods according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:
    at least one memory; and
    at least one processor coupled with the at least one memory and configured to cause the UE to:
        detect spatial information contained in first sensed scheduling information;
        select a resource and a beam for data transmission based on the detected spatial information;
        calculate a direction of the beam for the data transmission based on direction configuration information;
        transmit second scheduling information including the selected resource and spatial information of the beam for the data transmission, wherein the spatial information of the beam includes the direction of the beam calculated for the data transmission; and
        transmit the data transmission by using the selected resource and the direction of the beam.

2. The UE of claim 1, wherein the direction configuration information is received in a system information block (SIB) or is in pre-configuration.

3. The UE of claim 1, wherein the direction of the beam for the data transmission is represented by an elevation angle and an azimuth angle.

4. The UE of claim 3, wherein values of the elevation angle and the azimuth angle are integers within a range from zero to a certain maximized value.

5. The UE of claim 1, wherein the spatial information further includes at least one of a location of a transmitting UE and a location of a receiving UE.

6. The UE of claim 1, wherein, to select a resource and a direction of a beam for data transmission based on the detected spatial information, the at least one processor is further configured to cause the UE to:
    select the resource indicated in the first sensed scheduling information and reserved by other beams, when spatial multiplexing is achieved by the selected direction of beam.

7. The UE of claim 1, wherein the second scheduling information further explicitly or implicitly includes a time duration of a time offset, wherein the time offset defines a number of orthogonal frequency division multiple (OFDM) symbols which can be measured from a last symbol containing the second scheduling information to a first symbol of the data transmission.

8. The UE of claim 7, wherein the time offset is set to be larger than or equal to a time bound for a transmitting UE to use information in the second scheduling information for transmitting the data transmission or for a receiving UE to use information in the second scheduling information for receiving the data transmission.

9. The UE of claim 1, wherein, to transmit the second scheduling information, the at least one processor is further configured to cause the UE to transmit the second scheduling information by an omni-directional antenna.

10. The UE of claim 1, wherein to transmit the data transmission, the at least one processor is further configured to cause the UE to transmit the data transmission by beam-based transmission.

11. A user equipment (UE) for wireless communication, comprising:
    at least one memory; and
    at least one processor coupled with the at least one memory and configured to cause the UE to:
        receive a scheduling request for data transmission;
        detect spatial information contained in first sensed scheduling information;
        select a resource and a beam for the data transmission based on the detected spatial information;
        calculate a direction of the beam for the data transmission based on direction configuration information; and
        transmit second scheduling information including the selected resource and spatial information of the beam for the data transmission, wherein the spatial information of the beam includes the direction of the beam calculated for the data transmission.

12. The UE of claim 11, wherein the at least one processor is further configured to cause the UE to receive the data transmission by using the selected resource and the direction of the beam.

13. The UE of claim 11, wherein the direction configuration information is received in a system information block (SIB) or is in pre-configuration.

14. The UE of claim 11, wherein the direction of the beam for the data transmission is represented by an elevation angle and an azimuth angle.

15. The UE of claim 11, wherein, to select a resource and a direction of a beam for data transmission based on the detected spatial information, the at least one processor is configured to cause the UE to:
    select the resource indicated in the first sensed scheduling information and reserved by other beams, when spatial multiplexing is achieved by the selected direction of beam.

16. The UE of claim 11, wherein the scheduling request further explicitly or implicitly includes a latency bound for selected resource, and the latency bound defines a maximized time offset from a reception of scheduling request to an end of the data transmission.

17. A base station for wireless communication, comprising:
    at least one memory; and
    at least one processor coupled with the at least one memory and configured to cause the base station to:

receive, from a first user equipment (UE), a scheduling request for data transmission between the first UE and a second UE;

calculate a direction of a beam for the data transmission based on direction configuration information;

allocate a resource and the direction of the beam for the data transmission and allocate a resource for scheduling information in response to the scheduling request, wherein the scheduling information is for scheduling the data transmission; and transmit, to the first UE, the allocated resource and spatial information of the beam for the data transmission and the allocated resource for the scheduling information, wherein the spatial information of the beam includes the direction of the beam calculated for the data transmission.

18. The base station of claim 17, wherein the direction of the beam for the data transmission is represented by an elevation angle and an azimuth angle.

19. The base station of claim 17, wherein the scheduling request further includes a time duration for a transmitting UE or a receiving UE to use the allocated resource and the direction of the beam for the data transmission.

20. A processor for wireless communication, comprising:

at least one controller coupled with at least one memory and configured to cause the processor to:

detect spatial information contained in first sensed scheduling information;

select a resource and a beam for data transmission based on the detected spatial information;

calculate a direction of the beam for the data transmission based on direction configuration information;

transmit second scheduling information including the selected resource and spatial information of the beam for the data transmission, wherein the spatial information of the beam includes the direction of the beam calculated for the data transmission; and transmit the data transmission by using the selected resource and the direction of the beam.

* * * * *